(12) United States Patent
Nozu et al.

(10) Patent No.: US 9,026,326 B2
(45) Date of Patent: May 5, 2015

(54) VEHICLE CONTROL UNIT

(71) Applicant: JTEKT Corporation, Osaka-shi (JP)

(72) Inventors: Tomohiro Nozu, Anjo (JP); Ryohei Shigeta, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 151 days.

(21) Appl. No.: 13/742,720

(22) Filed: Jan. 16, 2013

(65) Prior Publication Data

US 2013/0184947 A1 Jul. 18, 2013

(30) Foreign Application Priority Data

Jan. 18, 2012 (JP) .................................. 2012-008062

(51) Int. Cl.
*B60W 30/18* (2012.01)
*B60W 10/119* (2012.01)
*B60W 10/04* (2006.01)
*B60K 23/08* (2006.01)

(52) U.S. Cl.
CPC ............. *B60W 10/119* (2013.01); *B60W 10/04* (2013.01); *B60K 2023/0833* (2013.01); *B60K 23/0808* (2013.01); *B60W 30/18027* (2013.01); *B60W 30/18118* (2013.01); *B60K 2023/0858* (2013.01); *B60W 2520/10* (2013.01); *B60W 2550/142* (2013.01)

(58) Field of Classification Search
CPC .............. B60W 10/14; B60W 10/119; B60W 2550/142; B60W 30/18027; B60K 2023/0833; B60K 2023/0858
USPC ................................................ 701/54, 68, 89
See application file for complete search history.

(56) References Cited

U.S. PATENT DOCUMENTS

| 2002/0046892 A1* | 4/2002 | Sakakiyama .................. 180/242 |
| 2003/0109978 A1* | 6/2003 | Murakami et al. .............. 701/89 |
| 2008/0154472 A1 | 6/2008 | Okuda et al. |
| 2009/0063000 A1 | 3/2009 | Kodama et al. |

FOREIGN PATENT DOCUMENTS

JP 2001-225657 8/2001

OTHER PUBLICATIONS

Extended European Search Report issued Apr. 16, 2013, in European Patent Application No. 13151254.3.

* cited by examiner

*Primary Examiner* — John Q Nguyen
*Assistant Examiner* — Anshul Sood
(74) *Attorney, Agent, or Firm* — Oblon, McClelland, Maier & Neustadt, L.L.P.

(57) ABSTRACT

When a vehicle speed is equal to or higher than a first vehicle speed threshold value or an uphill gradient is lower than a first gradient threshold value and uphill start control is cancelled, if a state where the vehicle speed is lower than a second vehicle speed threshold value and the uphill gradient is equal to or higher than a second gradient threshold value continues for a first set time, uphill start control is executed. When the vehicle speed is decreased after being once increased within a range where the vehicle speed is lower than the first vehicle speed threshold value and uphill start control is cancelled, if a state where the vehicle speed is lower than the second vehicle speed threshold value and the uphill gradient is equal to or higher than the second gradient threshold value continues for a second set time, the uphill start control is executed.

8 Claims, 4 Drawing Sheets

VEHICLE CONTROL UNIT

INCORPORATION BY REFERENCE

The disclosure of Japanese Patent Application No. 2012-008062 filed on Jan. 18, 2012 including the specification, drawings and abstract is incorporated herein by reference in its entirety.

BACKGROUND OF THE INVENTION

1. Field of the Invention

The invention relates to a vehicle control unit that executes uphill climbing control while a vehicle is traveling on an uphill slope.

2. Description of Related Art

Japanese Patent Application Publication No. 2001-225657 describes a drive power distribution control unit for a four-wheel-drive vehicle, which suppresses occurrence of a phenomenon of tight corner braking upon acceleration during forward turning or upon deceleration during backward tuning on a flat road, and which improves the starting performance at the time of an uphill start on, for example, an uphill slope with a low friction coefficient ($\mu$).

Whether to carry out uphill start control is determined depending upon whether the condition set based on, for example, a vehicle speed and an uphill gradient continues to be satisfied for a set time. Because a drive power distribution ratio for the four-wheel-drive vehicle is determined based on an uphill gradient, it is desirable to calculate an uphill gradient at the time of an uphill start in order to improve the starting performance. In a case where the vehicle stops after travelling at a low speed on an uphill slope, the uphill gradient when the vehicle stops may differ from the uphill gradient at the start of the uphill start control. Accordingly, the uphill start control that has been executed until the vehicle stops is cancelled, and then it is determined again whether the condition for uphill start control is satisfied. After that, the uphill start control is executed again.

However, when the vehicle starts on an uphill slope, the vehicle may start ascending the uphill slope after descending slightly, depending on a pedal operation or a shift operation. In this case, the uphill gradient may differ and the uphill start control is cancelled. In order to execute the uphill start control again in this case, the set time used to determine whether to carry out uphill start control may be shortened. However, if the set time is shortened, there is a possibility that a condition similar to that for the uphill start control will be satisfied upon acceleration from standstill on a flat road. Therefore, if the set time is excessively shortened, the uphill start control is executed upon acceleration from standstill on a flat road, which gives an occupant a sense of discomfort.

SUMMARY OF THE INVENTION

It is an object of the invention to provide a vehicle control unit that improves the uphill starting performance while suppressing occurrence of an erroneous determination on a flat road.

An aspect of the invention relates to a vehicle control unit that executes uphill start control. The vehicle control unit includes: a first cancellation determination unit that cancels the uphill start control and sets a cancellation situation type flag to OFF if a state where a vehicle speed is equal to or higher than a first vehicle speed threshold value or a state where an uphill gradient is lower than a first gradient threshold value continues for a predetermined time during execution of the uphill start control; a second cancellation determination unit that cancels the uphill start control and sets the cancellation situation type flag to ON if the vehicle speed is decreased after being once increased within a range in which the vehicle speed is lower than the first vehicle speed threshold value during execution of the uphill start control; a first execution determination unit that determines an uphill start control condition and executes the uphill start control if a state where the vehicle speed is lower than a second vehicle speed threshold value and the uphill gradient is equal to or higher than a second gradient threshold value continues for a first set time when the cancellation situation type flag is OFF; and a second execution determination unit that determines an uphill start control condition and executes the uphill start control if a state where the vehicle speed is lower than the second vehicle speed threshold value and the uphill gradient is equal to or higher than the second gradient threshold value continues for a second set time which is shorter than the first set time when the cancellation situation type flag is ON.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Hereinafter, a vehicle control unit according to an embodiment of the invention will be described with reference to the accompanying drawings.

Figure 1:
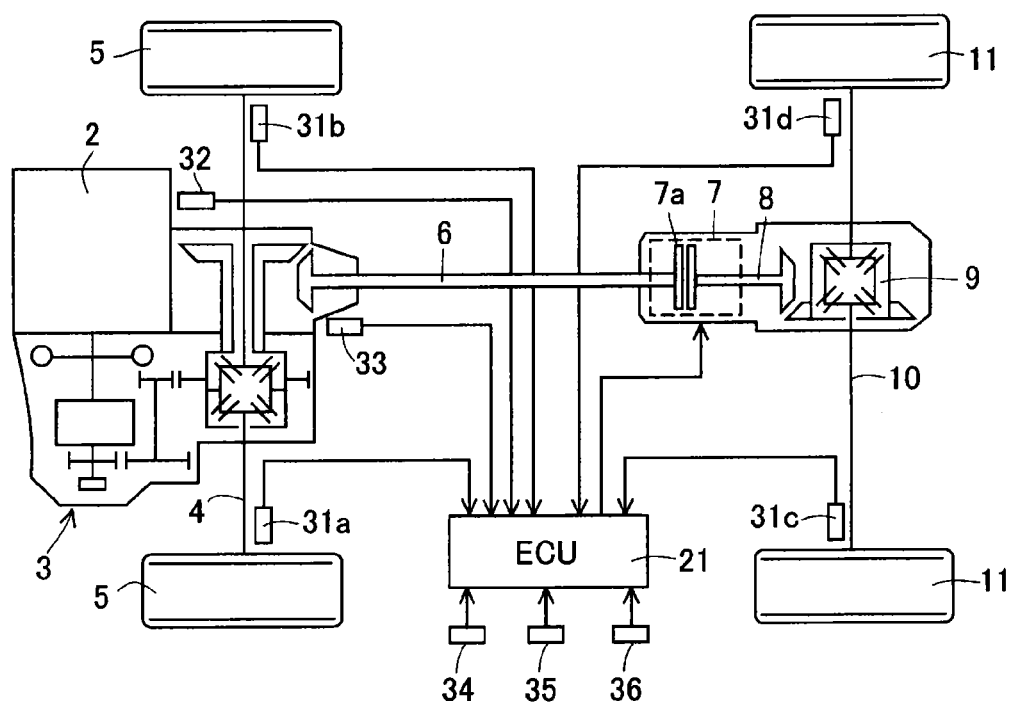
FIG. 1 is a view showing the configuration of a four-wheel-drive vehicle according to an embodiment of the invention.

The vehicle control unit according to the embodiment of the invention is applied to, for example, a four-wheel-drive vehicle. The schematic configuration of the four-wheel-drive vehicle will be described with reference to FIG. 1. As shown in FIG. 1, the four-wheel-drive vehicle includes an engine 2 that generates drive power, a drive power transmission system, front wheels 5 that serve as main drive wheels, rear wheels 11 that serve as auxiliary drive wheels, a control unit (ECU) 21, and various sensors 31 to 36. The power transmission system includes a transaxle 3, a front axle 4, a propeller shaft 6, a drive power transmission device 7, a drive pinion shaft 8, a rear differential 9, and a rear axle 10.

The drive power from the engine 2 is transmitted to the front wheels 5 via a transmission and a front differential, which constitute the transaxle 3, and the front axle 4. In addition, the drive power from the engine 2 is transmitted to the rear wheels 11 via the transaxle 3, the propeller shaft 6, the power transmission device 7, the drive pinion shaft 8, the rear differential 9, and the rear axle 10.

The power transmission device 7 includes a multi-plate wet electromagnetic clutch device 7a. A current having a current value calculated based on a control signal from the ECU 21 is supplied to a coil in the electromagnetic clutch device 7a, so that clutch plates are frictionally engaged with one another. On the basis of a frictional engagement force of these clutch plates, the drive power is transmitted in the form of torque from the propeller shaft 6 to the drive pinion shaft 8. Specifically, with an increase in the value of the current that is supplied to the coil of the electromagnetic clutch device 7a, the frictional engagement force of the clutch plates increases, and accordingly, the drive power that is transmitted to the drive pinion shaft 8 increases.

The ECU 21 calculates a value of current that is supplied to the coil in the electromagnetic clutch device 7a, based on signals output from the various sensors 31 to 36. That is, the ECU 21 selects one of a four-wheel drive mode and a two-wheel drive mode. When the four-wheel drive mode is selected, the ECU 21 executes variable control of a drive power distribution ratio based on which the drive power is distributed between the front wheels 5 and the rear wheels 11. There are wheel speed sensors 31a to 31d for the front left wheel, the front right wheel, the rear left wheel and the rear right wheel, respectively. Further, there are a throttle opening degree sensor 32, a steering angle sensor 33, a yaw rate sensor 34, a lateral acceleration sensor 35, and a longitudinal acceleration sensor 36.

Next, among the controls executed on the drive power transmission device 7 by the ECU 21, uphill start control will be described below. When it is determined that the vehicle is about to start on an uphill slope, the uphill start control is executed to make the amount of drive power that is transmitted to the rear wheels 11, which serve as auxiliary drive wheels, larger than that in normal control (in which no uphill start control is executed).

Figure 2:
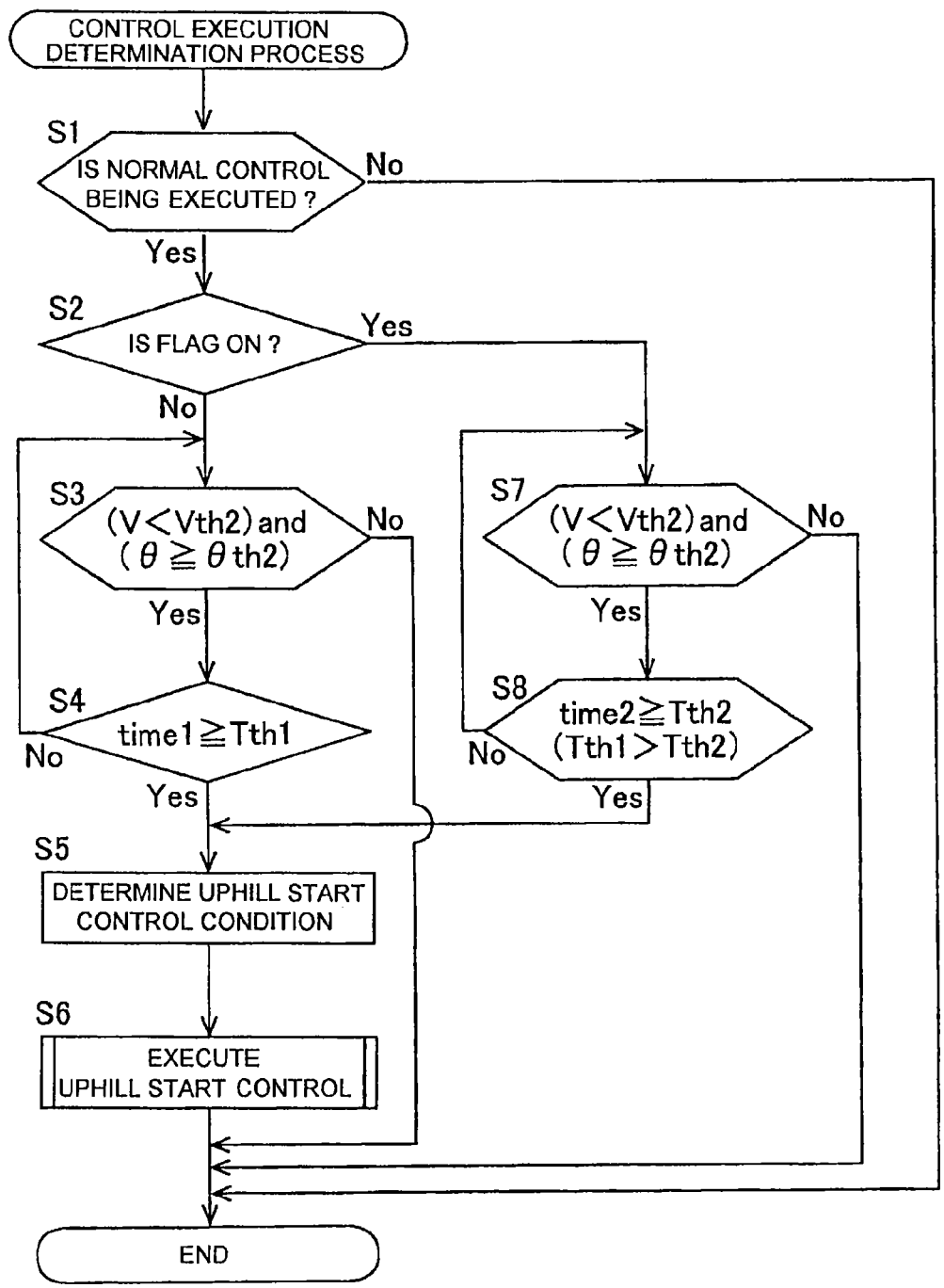
FIG. 2 is a flowchart showing a process for determining whether to execute uphill start control by an ECU in FIG. 1.

First, a process for determining whether to execute the uphill start control will be described with reference to FIG. 2. As shown in FIG. 2, whether the normal control is being executed is determined (step S1). If normal control is not being executed, that is, if the uphill start control is being executed, the process is ended. On the other hand, if the normal control is being executed, whether a cancellation situation type flag (hereinafter, referred to as "flag") is "ON" is determined (step S2). As indicated in S15, S18 in FIG. 3, the flag is set to "ON" or "OFF" in a process for determining whether to cancel the uphill start control. That is, the flag is set to "ON" or "OFF" on the basis of the cancellation condition. Note that the flag is set to "OFF" in an initial state.

If the flag is "OFF" (No in step S2), whether a vehicle speed V in the travelling direction is lower than a second vehicle speed threshold value Vth2 and whether an uphill gradient θ is equal to or higher than a second gradient threshold value θth2 are determined (step S3: an example of a first execution determination unit). The vehicle speed V is calculated based on signals output from the wheel speed sensors 31a to 31d. The uphill gradient θ is obtained based on an acceleration G in the travelling direction, which is detected by the longitudinal acceleration sensor 36. The travelling direction is determined, depending upon whether the selected drive gear is the forward gear or the reverse gear. Note that the second vehicle speed threshold value Vth2 is a value close to zero. That is, in step S3, it is determined whether the vehicle is in one of a state where the vehicle has stopped on an uphill slope or a state where the vehicle is travelling at an extremely low speed (hereinafter, referred to "substantially stopped") on an uphill slope.

If a determination condition in step S3 is satisfied, whether an elapsed time time1 from when the determination condition becomes satisfied is equal to or longer than a first set time Tth1 is determined (step S4: an example of a first execution determination unit). If the elapsed time time1 is shorter than the first set time Tth1, step 3 is executed again. On the other hand, if determination condition in step S3 is not satisfied, the process is ended.

Next, if the elapsed time time1 is equal to or longer than the first set time Tth1, an uphill start control condition is determined (step S5). Then, the uphill start control is executed on the basis of the condition (step S6). That is, if the state where the determination condition in step S3 is satisfied continues for the first set time Tth1, the uphill start control is executed. For example, if the vehicle is about to start on an uphill slope with a high uphill gradient θ, the uphill start control is executed because the conditions in both steps S3, S4 are satisfied. However, when the vehicle starts on a flat road, the determination condition in step S3 becomes unsatisfied immediately after the vehicle starts. Therefore, in this case, the uphill start control is not executed. Further, when the vehicle is travelling on an uphill slope with a low uphill gradient or on a downhill slope, the determination condition in step S3 is not satisfied.

The uphill start control condition signifies an amount of increase in the drive power that is transmitted to the rear wheels 11, which serve as the auxiliary wheels, from that in the normal control, that is, an amount of increase in the value of current that is applied to the coil in the electromagnetic clutch device 7a, from that in the normal control. That is, the drive power distribution ratio based on which the drive power is distributed between the front wheels 5 and the rear wheels 11 in the four-wheel drive mode, is changed depending upon the uphill gradient θ when the vehicle is substantially stopped.

On the other hand, if the flag is "ON" (Yes in step S2), whether the vehicle speed V in the travelling direction is lower than the second vehicle speed threshold value Vth2 and whether the uphill gradient θ is equal to or higher than the second gradient threshold value θth2 are determined (step S7: an example of a second execution determination unit). This determination condition is the same as that in step S3. Next, if the determination condition in step S7 is satisfied, whether an elapsed time time2 from when the determination condition in step S7 is satisfied is equal to or longer than a second set time Tth2 is determined (step S8: an example of a second execution determination unit). If the elapsed time time2 is shorter than the second set time Tth2, step S7 is executed again. On the other hand, if the determination condition in step S7 is not satisfied, the process is ended. Note that, the second set time Th2 is shorter than the first set time Th1.

Next, if the elapsed time time2 becomes equal to or longer than the second set time Tth2, an uphill start control condition is determined (step S5). Then, the uphill start control is executed on the basis of the uphill start control condition (step S6). That is, if the state where the determination condition in step S7 is satisfied continues for the second set time Tth2, the uphill start control is executed. For example, when the vehicle starts on an uphill slope, the vehicle may start ascending after descending the slope slightly. In this case, even if the uphill start control is once cancelled, the uphill start control is executed again.

Figure 3:
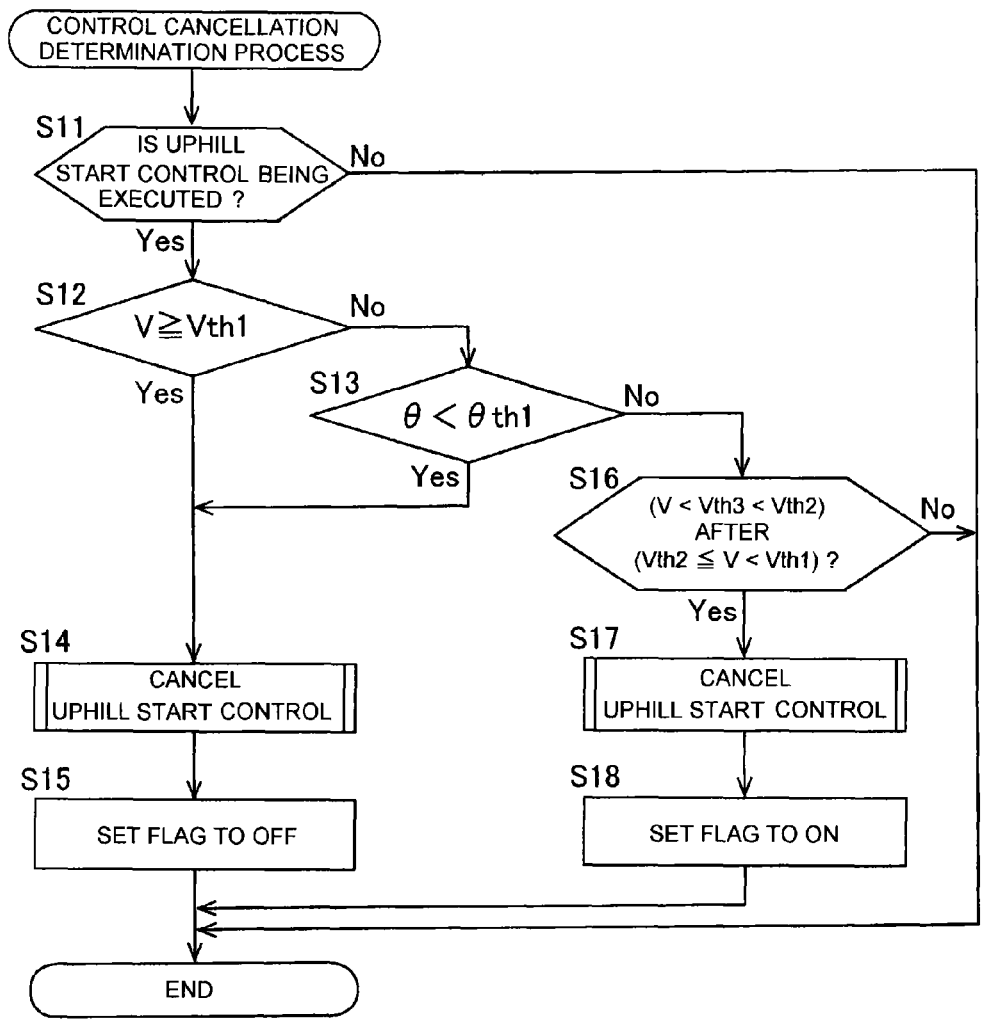
FIG. 3 is a flowchart showing a process for determining whether to cancel the uphill start control by the ECU in FIG. 1.

Next, a process for determining whether to cancel the uphill start control will be described with reference to FIG. 3. As shown in FIG. 3, whether the uphill start control is being executed is determined (step S11). If the uphill start control is not being executed, that is, if the normal control is being executed, the process is ended. On the other hand, if the uphill start control is being executed, whether the vehicle speed V is equal to or higher than the first vehicle speed threshold value Vth1 is determined (step S12: an example of a first cancellation determination unit). That is, whether the vehicle enters a high speed travelling state after the vehicle starts on an uphill slope is determined. On the other hand, if the vehicle speed V is lower than the first vehicle speed threshold value Vth1 (No in step S12), whether the uphill gradient θ is lower than the first gradient threshold value θth1 is determined (step S13: an example of a first cancellation determination unit). That is, whether the uphill gradient θ becomes lower after the vehicle starts on an uphill slope is determined.

If the vehicle speed V is equal to or higher than the first vehicle speed threshold value Vth1, or the uphill gradient θ is lower than the first gradient threshold value θth1, the uphill start control is cancelled (step S14), and the flag is set to "OFF" (step S15). Then, the process is ended.

On the other hand, if the vehicle speed V is lower than the first vehicle speed threshold value Vth1 and the uphill gradient θ is equal to or higher than the first gradient threshold value θth1, it is determined whether the vehicle speed V becomes lower than a third speed threshold value Vth3 after the condition that the vehicle speed V is equal to or higher than the second vehicle speed threshold value Vth2 and lower than the first vehicle speed threshold value Vth1 is satisfied (step S16: an example of a second cancellation determination unit). Note that the third speed threshold value Vth3 is lower than the second threshold value Vth2.

That is, in step S16, it is determined whether the vehicle speed V is decreased after the vehicle speed V is once increased within a range where the vehicle speed is lower than the first vehicle speed threshold value Vth1. This state corresponds to, for example, a case where the vehicle stops after travelling at a low speed on an uphill slope. This state also corresponds to a case where the vehicle starts ascending after descending slightly when the vehicle starts on an uphill slope. This is because the vehicle speed V is low while the vehicle is descending the slope and the vehicle stops at the moment at which the vehicle is about to start ascending.

The determination in step S16 is made after determinations in steps S12, S13 are both made. That is, the determinations in steps S12, 13 have higher priority than the determination in step S16. If the determination condition in step S16 is satisfied, the uphill start control is cancelled (step S17), and the flag is set to "ON" (step S18). Then, the process is ended. On the other hand, if the determination condition in step S16 is not satisfied, the process is ended.

Figure 4:
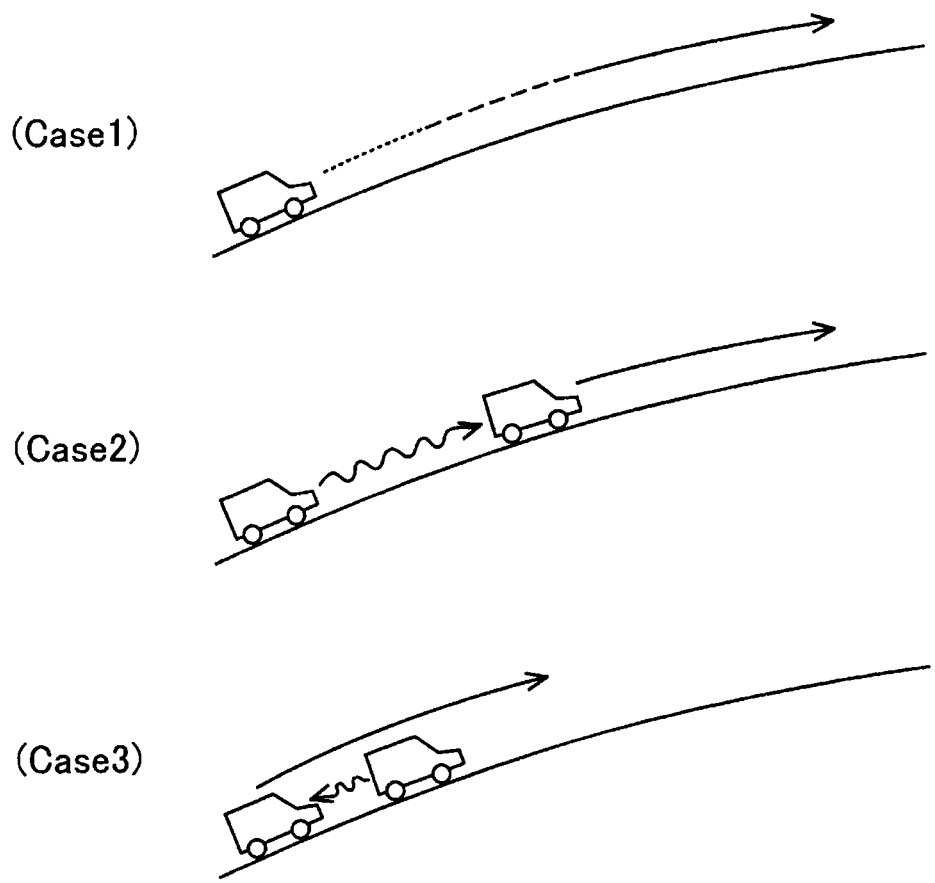
FIG. 4 is a view for describing the behaviors of the vehicle on an uphill slope in first to third cases.

Next, description will be provided on the process for determining whether to execute the uphill start control and the process for determining whether to cancel the uphill start control, with reference to specific cases as shown in FIG. 4.

In case 1, the vehicle starts travelling forward from a standstill state where the vehicle is stopped with its front side facing in the ascending direction on an uphill slope with a high uphill gradient θ. After the vehicle starts travelling forward, the vehicle moves onto a region of the uphill slope, the region having a low uphill gradient θ, while the vehicle speed is gradually increased.

In case 1, in the initial state, the uphill start control is not executed. Further, the flag in the initial state is set to "OFF". Accordingly, while the vehicle is stopped, a negative determination is made in step S2 and an affirmative determination is made in step S3 in FIG. 2. Further, because the elapsed time time1 from when the determination condition in step S3 becomes satisfied is equal to or longer than the first set time Tth1, an affirmative determination is made in step S4. Then, the uphill start control condition is determined based on the uphill gradient θ of the uphill slope on which the vehicle is stopped (step S5). Therefore, when the vehicle starts, the uphill start control is executed (step S6).

After that, because the vehicle speed is gradually increased or the uphill gradient θ becomes lower, an affirmative determination is made in step S12 or step S13 in FIG. 13. Therefore, the uphill start control is cancelled (step S14), and the flag is set to "OFF" (step S15). Thus, as in the description on case 1, a determination is made again with the use of the first set time Tth1 when the uphill start control is executed.

In case 2, the vehicle starts travelling forward at a low speed from a standstill state where the vehicle is stopped with its front side facing in the ascending direction on an uphill slope with a high uphill gradient θ. After the vehicle starts travelling forward, the vehicle once stops on the uphill slope in a region still having a high uphill gradient θ, and then starts travelling forward again. After the vehicle starts travelling forward again, the vehicle moves onto a region of the uphill slope, the region having a low uphill gradient θ, while the vehicle speed is gradually increased.

In case 2, when the vehicle starts travelling on an uphill slope from the initial standstill state, the uphill start control is executed as in case 1. After that, the vehicle travels forward at a low speed and once stops on the uphill slope in the region still having a high uphill gradient θ. Therefore, a negative determination is made in each of step S12 and step S13 and an affirmative determination is made in step S16. Accordingly, the uphill start control is cancelled (step S17), and the flag is set to "ON" (step S18).

Then, while the vehicle is once stopped after the vehicle starts travelling forward, the process for determining whether to execute the uphill start control is executed. Because flag is "ON", an affirmative determination is made in each of step S2, S7, and S8 in FIG. 2. Therefore, the uphill start control condition is determined based on the present uphill gradient θ (step S5). Thus, the uphill start control is executed on the basis of the newly set condition when the vehicle starts again (step S6).

In this case, because a determination in step S8 in FIG. 12 is made with the use of the second set time Tth2, which is shorter than the first set time Tth1, it is possible to execute the control based on the new uphill start control condition even if the time during which the vehicle is stopped is extremely short. That is, when the vehicle starts travelling forward again, the drive power distribution ratio, based on which the drive power is distributed between the front wheels 5 and the rear wheels 11, is set to an appropriate value.

In case 3, the vehicle attempts to start travelling forward from a standstill state where the vehicle is stopped with its front side facing in the ascending direction on an uphill slope with a high uphill gradient θ. However, the vehicle starts ascending after the vehicle slightly descents on the slope. After that, the vehicle moves onto a region of the uphill slope, the region having a low uphill gradient θ, while the vehicle speed is gradually increased.

In case 3, when the vehicle starts travelling on an uphill slope from the initial standstill state, the uphill start control is executed as in case 1. After that, the vehicle once descends, and the vehicle speed V is extremely low at this time. At the moment at which the vehicle starts ascending the uphill slope after descending, the vehicle is in a stopped state. Therefore, a negative determination is made in each of step S12 and S13 and an affirmative determination is made in step S16 in FIG. 3, the uphill start control is cancelled (step S17), and the flag is set to "ON" (step S18).

Then, the process for determining whether to execute the uphill start control is executed. In this case, because the flag is "ON", an affirmative determination is made in step S2 in FIG. 2. Further, because the vehicle is in the stopped state at the moment when the vehicle starts ascending the uphill slope after descending, an affirmative determination is made in step S7 in FIG. 2. In this case, the time during which the vehicle is stopped is extremely short. However, because the second set time Tth2 is short, even if the time during which the vehicle is stopped is extremely short, the determination condition in step S8 is satisfied. Thus, the uphill start control condition is determined based on the present uphill gradient θ (step S5), and the uphill start control is executed on the basis of the new condition when the vehicle starts travelling forward (step S6).

As described above, in the case where the vehicle ascends the uphill slope after slightly descending, even if the uphill start control is once cancelled, the uphill start control executed again when the vehicle starts ascending the uphill slope again. Therefore, it is possible to enhance the uphill starting performance.

Further, the determination time used to determine whether to execute the uphill start control is the long first set time Tth1, in the cases except the case where the vehicle starts ascending the uphill slope after the vehicle once stops as in cases 2 and 3. Therefore, when the vehicle starts and accelerates on a flat road, although the uphill start condition is satisfied instantaneously, the state where the uphill start condition is satisfied does not continue for the long determination time. Therefore, it is possible to suppress occurrence of an erroneous determination on a flat road. Thus, it is possible to suppress occurrence of the situation where an occupant feels a sense of discomfort due to an erroneous determination on a flat road.

Further, the determinations in steps S12, S13 shown in FIG. 3 have higher priority than the determination in step S16. If the determination conditions in step 12, 13 and the determination condition in step S16 are satisfied at the same time, a higher priority is given to the determinations in steps 12, 13. If the conditions are satisfied at the same time, it is not necessary to use the relatively short determination time (second set time Tth2) when the uphill start control is executed next time. By assigning the priorities as described above, it is possible to suppress occurrence of an erroneous determination.

Further, by applying the above-described uphill start control to the control for increasing the amount of drive power that is transmitted to the rear wheels 11, which serve as the auxiliary driving wheels, the drive power from the engine 2, which serves as a driving source, is efficiently used. Further, when the above-described uphill start control is executed or cancelled by controlling the electromagnetic clutch device 7a, it is possible to reduce wasteful power consumption by the electromagnetic clutch device 7a.

What is claimed is:

1. A vehicle control unit that executes uphill start control, comprising:
    a first cancellation determination unit that cancels the uphill start control and sets a cancellation situation type flag to OFF if a vehicle speed is equal to or higher than a first vehicle speed threshold value or if an uphill gradient is lower than a first gradient threshold value during execution of the uphill start control;
    a second cancellation determination unit that cancels the uphill start control and sets the cancellation situation type flag to ON if the vehicle speed is decreased after being once increased within a range in which the vehicle speed is lower than the first vehicle speed threshold value during execution of the uphill start control;
    a first execution determination unit that determines an uphill start control condition and executes the uphill start control if a state where the vehicle speed is lower than a second vehicle speed threshold value and the uphill gradient is equal to or higher than a second gradient threshold value continues for a first set time when the cancellation situation type flag is OFF; and
    a second execution determination unit that determines an uphill start control condition and executes the uphill start control if a state where the vehicle speed is lower than the second vehicle speed threshold value and the uphill gradient is equal to or higher than the second gradient threshold value continues for a second set time which is shorter than the first set time when the cancellation situation type flag is ON.

2. The vehicle control unit according to claim 1, wherein determination by the first cancellation determination unit has a higher priority than determination by the second cancellation determination unit when the uphill start control is executed.

3. The vehicle control unit according to claim 2, wherein:
    the vehicle comprises main drive wheels and auxiliary drive wheels to which drive power is able to be transmitted; and
    the uphill start control is a control for increasing an amount of drive power that is transmitted to the auxiliary wheels.

4. The vehicle control unit according to claim 3, wherein:
    the vehicle comprises an electromagnetic clutch that controls transmission of drive power to the auxiliary drive wheels using an engaging force; and
    execution and cancellation of the uphill start control is controlled by controlling the electromagnetic clutch.

5. The vehicle control unit according to claim 2, wherein:
    the vehicle comprises an electromagnetic clutch that controls transmission of drive power to auxiliary drive wheels using an engaging force; and
    execution and cancellation of the uphill start control is controlled by controlling the electromagnetic clutch.

6. The vehicle control unit according to claim 1, wherein:
    the vehicle comprises main drive wheels and auxiliary drive wheels to which drive power is able to be transmitted; and
    the uphill start control is a control for increasing an amount of drive power that is transmitted to the auxiliary wheels.

7. The vehicle control unit according to claim 6, wherein:
    the vehicle comprises an electromagnetic clutch that controls transmission of drive power to the auxiliary drive wheels using an engaging force; and
    execution and cancellation of the uphill start control is controlled by controlling the electromagnetic clutch.

8. The vehicle control unit according to claim 1, wherein:
    the vehicle comprises an electromagnetic clutch that controls transmission of drive power to auxiliary drive wheels using an engaging force; and
    execution and cancellation of the uphill start control is controlled by controlling the electromagnetic clutch.

* * * * *